May 4, 1965

D. MOHLER ET AL 3,182,235

ELECTRICAL CAPACITOR AND TITANIUM-CONTAINING
ELECTRODE MATERIAL THEREFOR

Filed Aug. 11, 1960

Inventors,
Donald Mohler,
John H. Westbrook,
Alfred L. Jenny,
by Sidney Greenberg
Their Attorney.

United States Patent Office 3,182,235
Patented May 4, 1965

3,182,235
ELECTRICAL CAPACITOR AND TITANIUM-CONTAINING ELECTRODE MATERIAL THEREFOR
Donald Mohler, Saratoga Springs, and John H. Westbrook, Ballston Spa, N.Y., and Alfred L. Jenny, Columbia, S.C., assignors to General Electric Company, a corporation of New York
Filed Aug. 11, 1960, Ser. No. 48,906
11 Claims. (Cl. 317—230)

The present invention relates to electrical capacitors, and more particularly, to novel titanium-containing electrode material therefor.

Electrical capacitors, especially those of the electrolytic type, commonly employ metal electrodes on which a thin dielectric oxide coating has been formed usually by anodic formation. Aluminum is commonly employed as a capacitor electrode material, the dielectric constant of the anodized aluminum oxide coating being in the neighborhood of 10. Since the capacitance of the capacitor is proportional to the dielectric constant of the dielectric layer, it is desirable to employ as high a dielectric constant oxide layer as possible to achieve a high level of capacitance without increasing the size of the capacitor, or, in other words, to provide a capacitor having a high capacitance per unit volume.

For this reason titanium has been considered heretofore for possible use as capacitor electrode material in view of the high dielectric constant of its oxide, which is about 10 times as high as that of aluminum oxide and about 5 times as high as the oxide of tantalum, another well-known capacitor electrode material. Titanium has other advantages, such as good corrosion resistance, relatively low cost, and low density. However, it has been found that continuous oxide films for dielectric purposes cannot readily be formed to acceptable voltage levels on the titanium metal by conventional anodizing methods such as used in connection with aluminum, tantalum, and other known capacitor electrode metals. Furthermore, even when a dielectric film is formed, these films are generally not stable with the passage of time, and deteriorate rapidly even in air.

It is an object of the invention to provide electric capacitors having novel film-forming electrodes.

It is another object of the invention to provide improved titanium-containing capacitor electrode material.

It is a further object of the invention to provide titanium alloys characterized by good electrical properties and adapted to be readily provided with dielectric oxide films for use in electrical capacitors, and especially electrolytic capacitors.

With the above objects in view, the present invention relates to an electric capacitor having a pair of metal electrodes, at least one of the electrodes comprising an alloy of titanium and a metal selected from the group consisting of tin and boron, the electrode having formed on the surface thereof an oxide film serving as the capacitor dielectric.

The invention will be better understood from the following description and accompanying drawing in which.

Figure 1:
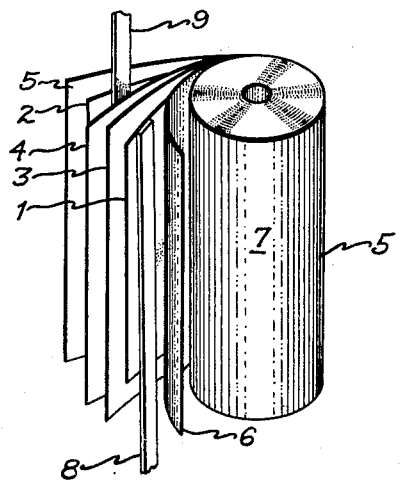
FIG. 1 shows an electrolytic capacitor assembly of rolled type in which the invention may be embodied.

Referring now to the drawing, and particularly to FIG. 1, the capacitor shown comprises a pair of metal foils 1 and 2, one or both of which is composed of a titanium alloy as hereinafter more fully described and having a dielectric oxide film on the surface thereof, the foils in the operation of the capacitor having opposite polarity. Between foils 1 and 2 are one or more sheets of dielectric spacer material 3, 4, 5 and 6 composed conventionally of kraft paper or other suitable spacer material of a porous saturable nature used to separate the foils. Terminals or trap straps 8 and 9 are secured to the respective foils and extend from the roll in opposite directions. The electrode foils and dielectric sheets are wound into a compact roll 7 prior to insertion into a casing as shown in FIG. 2.

Figure 2:
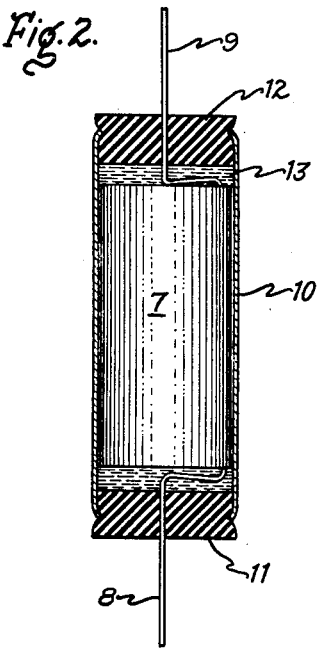
FIG. 2 shows the capacitor assembly of FIG. 1 arranged in a casing.

In FIG. 2 the capacitor roll assembly 7 is enclosed in a metal casing 10 with terminals 8 and 9 extending respectively through insulating plugs or discs 11, 12 fluid-tightly sealing the interior of the casing. A suitable electrolyte 13 such as an aqueous ammonium pentaborate glycol solution fills the casing and impregnates the porous spacer material.

Figure 3:
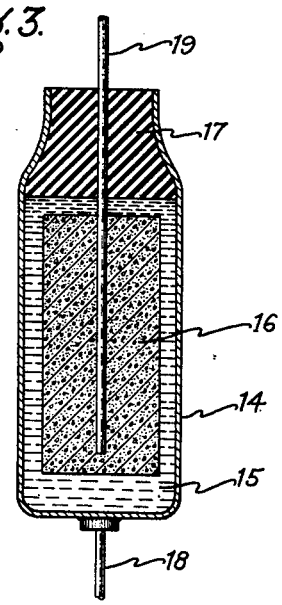

FIG. 3 shows a different type of electrolytic capacitor comprising a casing 14 serving as the cathode and containing an electrolyte 15 in which an anode 16 is immersed. Casing 14 may be silver or any metal which does not adversely affect the fill electrolyte or become corroded thereby. In this embodiment, the anode 16 is formed of the titanium alloy of the present invention by powder metallurgy techniques, wherein particles of the alloy are pressed and sintered into a porous compact mass or slug in accordance with known processes to provide a large surface area. A film forming lead wire 19 made from the alloy or aluminum tantalum or other film forming metal is embedded in the slug anode 16 and passes to the exterior of casing 14 through an insulating sealing disc or plug 17 around which casing 14 is crimped to provide a fluid-tight closure for the capacitor. At the opposite end of the capacitor, a cathode lead 18 is suitably joined by welding or otherwise to the outside of casing 14.

Slug anode 16 of the FIG. 3 capacitor as well as one or both foils 1, 2 of the FIG. 1 capacitor are preferably provided with thin anodic dielectric oxide films in accordance with anodizing processes well-known in the art.

Figure 4:
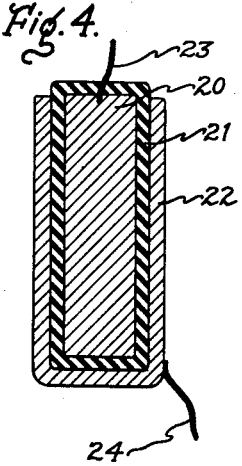
FIGS. 3, 4 and 5 illustrate other types of capacitors to which the invention is applicable.

FIG. 4 diagrammatically shows in exaggerated scale a so-called dry-type capacitor which may embody the invention and which comprises a base electrode 20 composed of the titanium alloy of the invention, an anodic dielectric oxide film 21 overlying the base electrode, and a counter electrode 22 in the form of a thin metal coating overlying oxide film 21 and spaced thereby from base electrode 20. Electrode layer 22 may be composed of any suitable conducting material such as aluminum, gold, tin, lead, zinc, or the equivalent, and may be applied by any metallizing or other suitable depositing procedure. Leads 23 and 24 are attached by any suitable means to electrodes 20 and 22, respectively.

Figure 5:
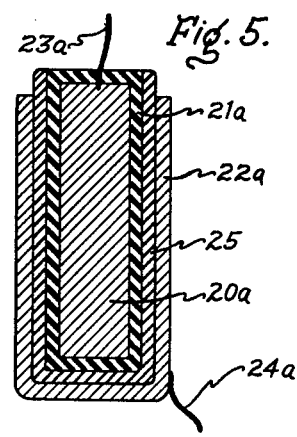

FIG. 5 shows a dry-type capacitor similar to that of FIG. 4 except that a layer 25 of semi-conductor material such as $MnO_2$ is interposed between the dielectric oxide layer 21a and the counter electrode 22a, the base electrode 20a also being composed of a titanium alloy in accordance with the invention.

The base electrode material of the dry-type capacitors of the FIGS. 4 and 5 embodiments, instead of being of solid, integral form as shown, may be composed of a compacted, sintered mass of particles of the titanium alloy, similar to the form of anode shown in FIG. 3. The counter electrodes of these capacitors may, if desired, be made of combined or composite layers. For example, in the semi-conducting layer embodiment graphite may be deposited over the semi-conducting layer prior to deposition of an outer metallic conducting layer on the graphite.

In accordance with the present invention, at least one of the capacitor electrodes, and more particularly the anode, is composed of an alloy of titanium with tin or boron. These alloys have been found to have excellent film-forming properties and adapted to form dielectric oxide films of superior electrical characteristics by ordinary anodizing processes.

In general, the titanium is present in preponderant amounts in the present alloys, with an amount of about 50–95% titanium apparently being optimum.

The titanium alloys of the invention provide unexpectedly good results for capacitor application especially when it is considered that anodically formed titanium oxide films are characterized by relatively poor electrical properties, such as leakage current, power factor, and stability of capacitance with time. The good film-forming properties of the above titanium alloys are further surprising in view of the fact that tin or boron themselves do not form a dielectric oxide film. It is also of interest in this connection to note that whereas it has been generally the trend in the art to improve the film-forming characteristics and dielectric properties of metal oxide films by the use of more purified electrode metals, we have found that improved results could be obtained by alloying titanium with other metals.

The composition of the oxide films formed on the titanium alloys of the invention is not definitely known, and it has not been determined that the proportions of the metals in the dielectric oxide in fact match the composition of the base alloy. However, because of the superior dielectric properties observed for these alloys in comparison to the pure (unalloyed) component metals, it is conceivable that some form of mixed oxide of the alloy is produced.

In tests made to determine the properties of the alloys of the invention when used as capacitor electrodes, typical examples of the above-mentioned titanium alloys were anodized in an electrolyte solution prepared from a mixture of ethylene glycol, water, boric acid, and ammonium hydroxide having a resistivity of approximately 250 ohm-centimeters. The electrode samples having the composition shown in the table below were used as the anode in a capacitor containing a fill-electrolyte having the same composition as the anodizing electrolyte, with a sheet of tantalum serving as the cathode. The results obtained when the alloys were anodized to 75 volts D.C. and the voltage stabilized at this level for 15 minutes are shown in the following table:

Table 1

| Alloy, Wt. Percent | Capacitance, $\mu f./in.^2$ (120 c.p.s.) | Dissipation Factor, Percent (120 c.p.s.) | Leakage Current, $\mu a./in.^2/75$ v. D.C. |
| --- | --- | --- | --- |
| 55%Ti–45%Sn | .74 | 12.0 | 250 |
| 65%Ti–35%Sn | 1.96 | 47 | 325 |
| 80%Ti–20%Sn | 3.35 | 51 | 300 |
| 95%Ti–5%Sn | 3.04 | 51 | 1046 |
| 90%Ti–10%B | 2.12 | 55 | 860 |

Considering that tantalum, a well-known electrolytic capacitor electrode material, has under the same conditions a capacitance of 1.0 $\mu f./in.^2$, a dissipation factor of 10–20%, and a leakage current of 100–1000 $\mu a.$, it is apparent that the above alloys provide extremely satisfactory results in electrolytic capacitor application. When compared to aluminum which provides a capacitance of 0.5 $\mu f./in.^2$ when anodized under the same conditions, the improvement afforded by the present alloys over this metal is quite considerable. The present titanium alloys also are considerably more satisfactory than elemental titanium, particularly in the much greater stability of capacitance and much lower dissipation factor values which the alloys exhibit.

Aside from the above comparisons, the present alloys offer substantial benefits over the widely used tantalum electrodes principally because of the much lower density of the alloy material and their lower cost. Thus, tantalum has a specific gravity of about 16, whereas the specific gravity of the present alloys is in the range of 5–8. Taking into account the fact that tantalum itself at present costs about 6 or 7 times as much as the alloy materials of the present invention, plus the saving of cost due to the lower density of the alloys, it will be quite apparent that a considerable cost reduction can be effected in the manufacture of electrolytic capacitors without sacrifice in the efficiency of operation of the capacitors.

The alloys described were prepared by arc melting the constituent elements in the desired proportion in an argon atmosphere, cold crucible arc furnace. This melting procedure is similiar to that described in Metal Progress, vol. 63, 1953, p. 70, or Review of Scientific Instruments, vol 25, 1954, p. 596, or Transactions AIME, vol. 188, 1950, p. 485. It will be realized, however, that the essence of the invention resides in filmed electrodes made of the alloys and not in the particular means of preparing the alloys. Techniques such as vacuum arc melting, vacuum induction melting, sintering, hot pressing, etc., will suggest themselves to those skilled in the art as possible alternatives which may in certain cases actually be preferable to the technique used here.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising, in combination, a pair of electrodes and a dielectric oxide film formed on one of said electrodes, at least said one electrode comprising an alloy of titanium and a metal selected from the group consisting of tin and boron.

2. An electrical capacitor comprising spaced electrodes, at least one of said electrodes comprising an alloy of titanium and a metal selected from the group consisting of tin and boron, a least said one electrode having formed thereon an anodic dielectric oxide film arranged between said electrodes.

3. An electrical capacitor comprising, in combination, a pair of electrodes and an electrolyte in contact therewith, at least one of said electrodes comprising an alloy of titanium and a metal selected from the group consisting of tin and boron, said electrode having an anodic dielectric film formed thereon.

4. An electrical capacitor comprising, in combination, a pair of electrodes and an electrolyte in contact therewith, at least one of said electrodes comprising an alloy composed of about 50–95% by weight of titanium and the remainder a metal selected from the group consisting of tin and boron.

5. An electrical capacitor comprising a first electrode layer comprising an alloy of titanium and a metal selected from the group consisting of tin and boron, a dielectric film composed of an oxide of said alloy formed on said first electrode layer, and a second electrode layer superposed on said dielectric oxide film and spaced thereby from said first electrode layer.

6. An electrical capacitor comprising a first electrode layer comprising an alloy of titanium and a metal selected from the group consisting of tin and boron, a dielectric film composed of an oxide of said alloy formed on said first electrode layer, a layer of semi-conductive material superposed on said dielectric oxide film and a second electrode layer superposed on said layer of semi-conductive material and spaced by the latter and the dielectric film from said first electrode layer.

7. An electrode for electrical capacitors comprising an alloy of titanium and a metal selected from the group consisting of tin and boron, said electrode having a dielectric oxide film formed thereon.

8. An electrode as defined in claim 7, wherein the electrode is in the form of an integral sheet.

9. An electrode as defined in claim 7, wherein the electrode is in the form of a pressed, sintered mass of particles.

10. An electrode as defined in claim 7, wherein a layer of semi-conductive material overlies said dielectric oxide film.

11. An electrode for electrical capacitors comprising an alloy of 50–95% by weight of titanium and a metal selected from the group consisting of tin and boron, said electrode having an anodic dielectric oxide film formed thereon.

References Cited by the Examiner

UNITED STATES PATENTS

| 1,682,846 | 9/28 | Kremers | 317—233 |
| 2,083,254 | 6/37 | Cowles | 317—230 |
| 2,504,178 | 4/50 | Burnham | 317—230 |

FOREIGN PATENTS

| 160,620 | 2/54 | Australia. |

DAVID J. GALVIN, *Primary Examiner.*

SAMUEL BERNSTEIN, GEORGE N. WESTBY,
*Examiners.*